US010732020B1

(12) United States Patent
Spriggs (10) Patent No.: US 10,732,020 B1
(45) Date of Patent: Aug. 4, 2020

(54) APPARATUS SYSTEMS, AND METHODS FOR DETERMINING CUTTINGS LEVEL OR VOLUME IN AN ENCLOSED CUTTINGS SKIP

(71) Applicant: GRASS SKIRT OILFIELD CONSULTING INC., Kaneohe, HI (US)

(72) Inventor: Paul N. Spriggs, Kaneohe, HI (US)

(73) Assignee: GRASS SKIRT OILFIELD CONSULTING INC., Kaneohe, HI (US)

( * ) Notice: Subject to any disclaimer, the term of this patent is extended or adjusted under 35 U.S.C. 154(b) by 146 days.

(21) Appl. No.: 16/117,379

(22) Filed: Aug. 30, 2018

Related U.S. Application Data

(60) Provisional application No. 62/556,537, filed on Sep. 11, 2017.

(51) Int. Cl.
*G01F 23/292* (2006.01)
*E21B 41/00* (2006.01)
*E21B 12/00* (2006.01)

(52) U.S. Cl.
CPC ........... *G01F 23/292* (2013.01); *E21B 12/00* (2013.01); *E21B 41/005* (2013.01)

(58) Field of Classification Search
CPC ...... G01D 11/30; G01D 11/245; G01D 11/24; G01N 29/26; G01N 29/265; G01F 23/00–76

(Continued)

(56) References Cited

U.S. PATENT DOCUMENTS 3,805,905 A 4/1974 McClusky
4,461,576 A * 7/1984 King .................. G01F 23/292
250/559.24

(Continued)

FOREIGN PATENT DOCUMENTS

JP 06011328 A * 1/1994
WO 2004083597 A1 9/2004

(Continued)

OTHER PUBLICATIONS

"A Users Guide to Intrinsic Safety", Cooper Crouse-Hinds MTL Inc., Houston Texas (USA), Nov. 2010, p. 1-20.

(Continued)

*Primary Examiner* — Nathaniel J Kolb
(74) *Attorney, Agent, or Firm* — Jeffrey L. Wendt; The Wendt Firm, P.C.

(57) ABSTRACT

A sensor mounting apparatus and methods for determining level, volume, or both of contaminated cuttings in a cuttings skip includes a collar having a body having a longitudinal axis, a first end, a second end, and a sidewall connecting the first and second ends, the sidewall parallel to the axis, the sidewall having an external surface and an internal surface, the internal surface defining a longitudinal bore through the coupling configured to allow material to flow there through. The apparatus includes a sensor receiver in the sidewall that holds a TOF sensor, the sensor receiver extending from the external surface to the internal surface of the collar, the sensor receiver having an axis skewed at an angle from the sidewall of the body. Fasteners on the first and second ends allow them to be fastened to a fill hose or chute and to a fill opening for the cuttings skip.

8 Claims, 8 Drawing Sheets

(58) Field of Classification Search
USPC .................................................... 73/866.5
See application file for complete search history.

(56) References Cited

U.S. PATENT DOCUMENTS

| | | | |
|---|---|---|---|
| 4,696,357 A | 9/1987 | Beehler | |
| 4,782,865 A | 11/1988 | Everman | |
| 4,852,416 A * | 8/1989 | Boone | G01B 17/00 73/866.5 |
| 4,854,353 A | 8/1989 | Russell | |
| 5,259,425 A | 11/1993 | Johnson | |
| 6,988,567 B2 | 1/2006 | Burnett | |
| 7,195,084 B2 | 3/2007 | Burnett | |
| 7,552,634 B2 * | 6/2009 | Huber | G01F 23/003 73/290 V |
| 8,511,150 B2 | 8/2013 | Lucas et al. | |
| 8,591,151 B2 | 11/2013 | Webb | |
| 8,656,991 B2 | 2/2014 | Farrar | |
| 8,662,163 B2 | 3/2014 | Farrar | |
| 9,073,104 B2 | 7/2015 | Burnett | |
| 2004/0031335 A1 * | 2/2004 | Fromme | G01B 11/24 73/865 |
| 2005/0183574 A1 * | 8/2005 | Burnett | B65G 53/12 95/271 |
| 2012/0318581 A1 | 12/2012 | Webb | |
| 2013/0228371 A1 | 9/2013 | Farrar | |
| 2013/0228380 A1 | 9/2013 | Farrar | |
| 2017/0152713 A1 | 6/2017 | Dowdy | |

FOREIGN PATENT DOCUMENTS

| | | |
|---|---|---|
| WO | 2011000037 A1 | 1/2011 |
| WO | 2014149065 A1 | 9/2014 |
| WO | 2014149066 A1 | 9/2014 |
| WO | 2017095676 A1 | 6/2017 |

OTHER PUBLICATIONS

"BV Series Piston Vibrators", Chicago Vibrator, Division of CVP Group Inc., Westmont, Illinois (USA), Sep. 2015, p. 1-2.
"BV Air Cushioned Series Piston Vibrators", Chicago Vibrator, Division of CVP Group Inc., Westmont, Illinois (USA), Aug. 2015, p. 1.
Wikipedia, "Load Cell", author unknown, downloaded from the Internet Jul. 14, 2017, p. 1-6.
"Load Cells—Hydraulic", author unknown, downloaded from the Internet Jul. 14, 2017, p. 1-2.
"2.6m3 (16.5 bbls vacuum rated to 5 psi)", Type 111 Offshore Mud Cuttings Skips, OEG Offshore, downloaded from the Internet Jul. 7, 2017, p. 1.
"2.8m3 (17.5 bbls Mud Cuttings Skip)", Type 214 Mud Cuttings Skips, OEG Offshore, downloaded from the Internet Jul. 7, 2017, p. 1.
"6.4m3 (40 bbls vacuum rated to 5 psi)", Type 153 Offshore Mud Cuttings Skips, OEG Offshore, downloaded from the Internet Jul. 7, 2017, p. 1.
Large Drill Cuttings Skips, OEG Offshore, downloaded from the Internet Jul. 7, 2017, p. 1.
"OPT8241 3D Time-of-Flight Sensor", Texas Instruments, Dallas, Texas (USA), Oct. 2015, p. 1-34.
"Drilling Manual", 11th Ed., International Association of Drilling Contractors, Houston, Texas, USA, 2000, pp. Y1-Y90.

* cited by examiner

502
A method of easily and safely determining level of contaminated cuttings in an enclosed cuttings skip, the method comprising:

504
Flowing contaminated cuttings from a drilling or well completion operation into a cuttings skip through a contaminated cuttings feed hose or chute and into a feed opening of the cuttings skip, the cuttings skip equipped with a sensor mounting apparatus and a TOF sensor mounted therein, the sensor mounting apparatus and TOF sensor positioned on the cuttings skip in a position selected from the feed opening and a non-feed-opening, the sensor mounting apparatus comprising a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through, and a sensor receiver in the sidewall into which the TOF sensor has been inserted, the sensor receiver extending from the external surface to the internal surface of the body, the sensor receiver having an axis skewed at an angle $\phi$ from the sidewall of the body, wherein $\phi$ ranges from greater to 0° to less than about 90°, or from about 5° to about 60°, or from about 10° to about 45°;

506
Determining distance from the TOF sensor to a top of the contaminated cuttings at one or more positions inside the cuttings skip by operating the TOF sensor; and 508
Calculating level of the contaminated cuttings at the one or more positions using the measured distance and angle $\phi$.

APPARATUS SYSTEMS, AND METHODS FOR DETERMINING CUTTINGS LEVEL OR VOLUME IN AN ENCLOSED CUTTINGS SKIP

BACKGROUND INFORMATION

Technical Field

The present disclosure relates to apparatus and methods in the onshore and marine (offshore) hydrocarbon exploration, production, drilling, well completion, well intervention, and leak containment fields. More particularly, the present disclosure relates to apparatus, systems, and methods useful for determining drill cuttings (sometimes referred to in the oil & gas industry as "mud cuttings", and herein sometimes as simply "cuttings") level or volume, or both in an enclosed "mud cuttings skip" or "cuttings skip", sometimes referred to in the industry as "cuttings boxes", "drill cuttings bins", and other terms of art in the industry for a container that collects drill cuttings.

Background Art

Cuttings produced when drilling oil or gas wells with oil based drilling fluid, be it synthetic or natural, require special containment and treatment. This is generally a requirement stipulated by the governing authority, or in many cases, driven by the operator.

A service exists within the oil industry for the management, control, handling and eventual treatment of contaminated drill cuttings. (As used herein, and as will be further explained, the term "contaminated" means any drill cuttings that have been through none, all or a combination of any one or more of the common mechanical, thermal, chemical cuttings waste treatment methods.) At the drilling rig site, the cuttings are collected into steel cuttings skips. The skips are enclosed and typically comprise at least a single hinged inspection hatch. The hatch has a rubber seal to prevent the ingress of air and egress of noxious fumes from the skip. Additional openings may exist on the skips. At least one will be for connecting the hose down through which the cuttings fall into the skip. A second similar opening may also exist depending on the skip design. A port for connecting a vent hose is often available as well as a port for a pressure/vacuum relief valve.

The complete assembly is enclosed making it difficult to determine the level, volume, dryness and distribution of cuttings inside the skip. The skips have a net weight themselves as well as a safe gross weight that they can contain. Naturally, the volume, and thus weight of cuttings must not exceed the volume and/or maximum allowable gross weight of the cuttings skip. However, not filling them completely may lead to unnecessary crane lifts, in other words, the skips being changed out before they are full.

The current means of determining the cuttings level or volume within the skip is to open an inspection hatch and look inside the skip. In doing so, the seal is broken on the skip; fumes vent from the skip into the surrounding environment and air (oxygen) is allowed to enter the skip. This is not a desirable condition, and is one that circumvents all efforts to keep the skips enclosed.

Quite often, the cuttings will form a pile directly beneath the discharge hose through which they fell. It is therefore common for rig workers to manually distribute the cuttings throughout the skip in order to evenly fill the skip. If the cuttings pile is left undisturbed, the cuttings have been known to back up within the discharge hose causing a blockage. This interrupts the cuttings handling process while the blockage is manually cleared. The greater concern is personnel now working around an open hatch pushing cuttings around a skip with whatever tool is available. The fumes coming out are very unpleasant.

Having an accurate understanding of the overall volume of cuttings returned from the well is generally desirable. This trending information is valuable to those drilling the well for various reasons. In an enclosed system, it is not possible to see the total volume of cuttings returned from the well. Although using a skip of known volume, the enclosed system prevents determination of the total volume contained. Subjective guesses at volumes are generally made.

Similar to total volume, the rate at which cuttings are being swept out of the well serves as valuable information from a drilling performance perspective. Ensuring good hole cleaning avoids a series of costly problems when drilling. Again, within an enclosed system, it is not possible to measure the rate at which cuttings are entering the skip.

The only current means of determining the gross weight of a cuttings skip in an offshore environment is to pick the skip up using one of the onboard cranes. To do this the crane must be attached to the skips using slings and the skip picked up. If the skip is still attached to the discharge hose and other hoses, then these need to be removed. To avoid this, the inspection hatch is normally opened and a visual determination of the skips fullness is determined. It may be possible to continue filling the skip based on weight, but unless the cuttings are distributed throughout the skip, the skip may be removed early since the gross weight is unknown. If effort to attach the crane has been made, and the hoses removed, the likelihood will be to just change the skip out for an empty one. This means skips are being back loaded partially full. The more skips used and handled means an increase in cost, but more importantly, increased handling of heavy lift items. The fewer heavy lifts performed at a rig site, the better and safer the operation. On land-based operations, the forklift may be used to lift the cuttings skip. Not all forklifts have a means of measuring the weight of the item they are picking up, and there are many factors that influence the gross weight a forklift can lift. Uncertain of this, a mobile crane may be necessary to lift the skip in order to determine the weight. Again, at this stage, hoses will have been disconnected, at which point, the skip may as well be changed out.

Analogous containers may be used during well completion, production, and workover. The present disclosure is applicable to all such containers that must be lifted and removed or replaced, and referred to herein as "oilfield containers" or "rig containers", since they frequently appear on drilling rigs and are used by rig workers. There are many types of offshore containers, oilfield containers, rig containers and the like, and the present disclosure is relevant to all, whether compliant or not with industry standards such as DNV (Det Norske Veritas) 2.7-1 or BSEN (British Standard European Norm) 12079, vacuum-rated or non-vacuum-rated, and regardless of size, the only requirement being that they are "enclosed" such the inside cannot be viewed without opening of the container by removal of bolts or other fasteners. Waste skips typically have a hinged plastic or metal lid that can more or less easily be lifted by a worker or forklift, and are therefore not within the present disclosure.

U.S. Pat. Nos. 8,656,991 and 8,662,163 disclose a closed loop system for waste treatment that has as its intent to lower the risk of permanent paralysis of a person working on a rig and lower the chance of a head injury for a person working on a rig by eliminating the need to lift a box of waste off a rig. WO2004083597A1 discloses apparatus and methods for moving or transporting drilled cuttings, and in certain embodiments tank sensors weigh a tank collecting cuttings, and the level of cuttings in a tank is measured using an ultrasonic sensor. However, neither level nor volume inside contaminated drill cutting skips, nor weight of contaminated drill cuttings is measured. Contaminated cuttings that may have undergone one or more treatments prior to entering the skip may pose more problems of clogging and piling compared to contaminated cuttings, since they have less fluid that may lubricate the pile, although contaminated cuttings that may have undergone one or more treatments prior to entering the skip pose somewhat less risk of exposure to noxious fumes as contaminated cuttings. Contaminated cuttings, especially those that have undergone some form of drying treatment, may clog skip feed lines, and may form piles of cuttings without spreading out in the skip or other container, forcing personnel to insert a stick or pole into the skip to unclog the feed line, or spread out the pile of cuttings. Examples of cuttings skips may presently be found on the Internet websites of companies such as: OEG Offshore; Tiger Offshore (Beaumont, Tex.); and Suretank Group Ltd. (Dunleer, Co. Louth, Ireland). Rig cranes are available from sources such as TSC Offshore and others. All of these patents, published patent applications, and Internet webpages showing skips, oilfield containers, drilling rigs, and cranes for use on drilling rigs are incorporated herein by reference for their disclosure of structure and operation of cuttings skips, and accessories for same, such as hoses, pumps, and the like, and rigs and rig cranes.

Rig personnel safety is of utmost concern. The inventor herein personally knows of incidents, both offshore and onshore, where the skips have been determined to be not full of cuttings but nevertheless have been lifted by rig cranes and replaced with empty skips. As noted above, this results in a more than necessary number of crane lifts on rigs, with the potential for accidents and injury to rig workers therefore increasing.

As may be seen, current practice of determining cuttings level or volume in cuttings skips, attaching chains and other lifting devices, and lifting out the partially full skips and replacing them with empty skips may not be adequate for all circumstances, and at worst have resulted in injury to rig workers. There remains a need for more safe, robust methods and apparatus allowing the cuttings level or volume of cuttings in skips to be determined, particularly for methods and apparatus that reduce exposure of rig personnel to fumes from cuttings and unnecessary lifts using rig cranes and potential for injury. The methods and apparatus of the present disclosure are directed to these needs.

SUMMARY

In accordance with the present disclosure, apparatus for determining contaminated cuttings level in enclosed skips are presented, and methods of using same to determine level of contaminated cuttings in skips and other containers are described which reduce or overcome many of the faults of previously known apparatus and methods.

A first aspect of the disclosure is a sensor mounting apparatus comprising:
(a) a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the coupling configured to allow material to flow there through;
(b) a sensor receiver in the sidewall configured to receive therein a sensor, the sensor receiver extending from the external surface to the internal surface of the body, the sensor receiver having an axis skewed at an angle Ø from the sidewall of the body, wherein Ø ranges from greater than 0° to less than about 90°, or from about 5° to about 60°, or from about 10° to about 45°.

In certain embodiments the sensor mounting apparatus may comprise fasteners on the first and second ends allowing the first end to be fastened to a fill hose or chute and the second end to a fill opening for a container. In certain embodiments the fasteners may be selected from the group consisting of flange couplings, QC/QDC couplings, cam and groove (CAMLOCK) fittings, and threaded fittings. In certain embodiments a TOF sensor may be removably inserted into the sensor receiver by a fastening method selected from the group consisting of welding, brazing, friction fitting, rubber seal fittings, threaded fitting, QC/QDC fittings, and cam and groove fittings.

In certain embodiments the collar sidewall may comprise a stationary inner sidewall portion and a rotatable outer sidewall portion, the stationary inner sidewall portion having an outer bay for accommodating the rotatable outer sidewall portion. In these embodiments, the stationary inner sidewall portion further has two or more through ports positioned circumferentially and generally in the same plane as the sensor. The sensor receiver is mounted in (or formed or milled in) the rotatable outer sidewall portion. A lower end of the rotatable outer sidewall may include a circumferential groove machined or formed in the lower end, and a lower edge of the bay of the stationary inner sidewall portion may include a matching groove machined or formed therein, the grooves accommodating bearings. In certain embodiments the sensor mounting apparatus may further include one or more sealing members between the stationary and rotatable sidewall portions, preventing noxious fumes from inside the cuttings skip to escape to the atmosphere and preventing air ingress.

A second aspect of the disclosure is a scanner mounting apparatus comprising:
(a) a coupling comprising a body, the body having a surface configured to mate and seal with an enclosed cuttings skip opening;
(b) a scanner housing retained by the coupling; and
(c) a movable multipoint TOF scanner comprising an array of a plurality of TOF sensors retained by the scanner housing,
wherein the scanner housing is configured to allow the movable multipoint TOF scanner to sweep scan using the array of TOF sensors producing a plurality of beams through a head space of the enclosed cuttings skip, the movable multipoint TOF scanner able to sweep through an angle θ ranging from 0 to about 180°, or from about 20° to about 160°, or from about 40° to about 120°, the angle θ measured in a plane perpendicular to horizontal, and wherein the array of TOF sensors of the movable multipoint TOF scanner is configured to have a lateral scan angle α at least large enough to scan as wide as an internal width of the enclosed cuttings skip.

In certain embodiments each of the TOF sensors of the array of TOF sensors is selected from the group consisting of an 3D TOF image scanner and a laser. In certain embodiments the multipoint scanner may be operated remotely via wired or wireless communication. In certain other embodiments the multipoint scanner may be operated locally via on-board batteries, an on-board motor, and a programmable logic controller. In certain embodiments the multipoint scanner may be configured to scan in modes selected from the group consisting of continuous scan mode and periodic scan mode. Certain embodiments may comprise a software module including one or more algorithms for calculating parameters selected from the group consisting of volume of cuttings in the enclosed cuttings skip, rate of deposition of cuttings in the enclosed cuttings skip, rate of accumulation of cuttings in the enclosed cuttings skip, and topography of cuttings in the enclosed cuttings skip, and combinations thereof.

Systems and methods for easily and safely determining contaminated cuttings level and optionally other cuttings parameters in an enclosed cuttings skip are further aspects of the disclosure and described herein.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain sensor mounting apparatus and methods may comprise a number of physical components and features, but may be devoid of certain optional hardware and/or other features.

BRIEF DESCRIPTION OF THE DRAWINGS

The manner in which the objectives of this disclosure and other desirable characteristics can be obtained is explained in the following description and attached drawings in which:

FIGS. 7, 8, and 9 are logic diagrams of three methods of determining level of contaminated cuttings in an enclosed cuttings skip.

It is to be noted, however, that the appended drawings of FIGS. 1-4, 5A, 5B, and 6 may not be to scale, and illustrate only typical apparatus embodiments of this disclosure. Furthermore, FIGS. 7, 8, and 9 illustrate only three of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the disclosed apparatus, combinations, and methods. However, it will be understood by those skilled in the art that the apparatus, combinations, and methods disclosed herein may be practiced without these details and that numerous variations or modifications from the described embodiments may be possible. All U.S. published patent applications and U.S. patents referenced herein are hereby explicitly incorporated herein by reference, irrespective of the page, paragraph, or section in which they are referenced. Where a range of values describes a parameter, all sub-ranges, point values and endpoints within that range are explicitly disclosed herein.

The present disclosure describes apparatus, systems, and methods for determining the contaminated cuttings or other solids level or volume, or both, within an enclosed cuttings skip. By measuring distances and angles, the cuttings level within the skip may be determined at either a single point or multiple points. The methods, systems, and apparatus of the present disclosure may determine:

1. How well cuttings are being distributed throughout the cuttings skip.
2. The volume of cuttings within the skip and remaining space available for cuttings.
3. Calculates the rate at which cuttings are entering the skip.

As mentioned herein, "contaminated" cuttings means any drill cuttings, including those that have been through none, all or a combination of any one or more of the common mechanical, thermal, chemical cuttings waste treatment methods. The IADC (International Association of Drilling Contractors) Drilling Manual, when discussing "Solids Control Equipment", discusses various methods of separating the solids from the drilling fluid through mechanical or thermal methods. There is also chemical treatment whereby flocculants, for example, nay be added to assist in separating fluid from rock. However, the chemicals are used in conjunction with mechanical methods. So a shaker, which, on most rigs, is the primary mechanical treatment, provides a vibratory screening treatment. After this, one or more hydrocylones and centrifuges may be used to extract more fluid out of the cuttings. This would thus be the centrifugal force applied. Additionally there could be a cuttings drier installed to reduce the fluid content down to less than 5%. This may also be a centrifugal method. The apparatus, systems and methods of the present disclosure are applicable to all drill cuttings, and indeed other solids.

The apparatus may comprise a single or multiple sensors (sometimes referred to herein as "instruments") using the "time of flight" principle to determine cuttings height at either a single or multiple series of points within the skip. Apparatus, systems, and methods of the present disclosure may employ:

1. Single point measurement; or
2. Multiple point measurement.

The sensor(s) may be mounted onto the skip through a variety of ways depending on the sensor being installed, openings available in the skip, and the level of accuracy required. Software either intrinsic to the sensor or installed remotely on a computer type device, converts the time of flight measurements into usable calculated information. The usable calculated information may be displayed locally at the device and/or remotely on a computer type device.

Apparatus Type

1. Single Point Measurement

Apparatus, systems, and methods within these embodiments send and receive a single "beam" to determine the distance to a single point within the cuttings skip. Converting the time of flight and angle of the beam (θ), the depth of cuttings at that single point would be determined.

2. Multipoint Measurement

Apparatus, systems, and methods within these embodiments send and receive an array of beams to determine the distance to multiple points along a plane within the skip.

Converting the time of flight and angle of the beams, the depth of cuttings along the plane would be determined.

The primary features of the apparatus, systems, and methods of the present disclosure will now be described with reference to the drawing figures, after which some of the construction and operational details, some of which are optional, will be further explained. The same reference numerals are used throughout to denote the same items in the figures.

Apparatus of the present disclosure may be installed at one of a series of positions on a cuttings skip. Where it is installed will depend on the functionality required, the instrument being used, and the type of skip being used to collect the cuttings. Below are a series of locations where the apparatus would be installed. The series is by no means complete.

Figure 1:
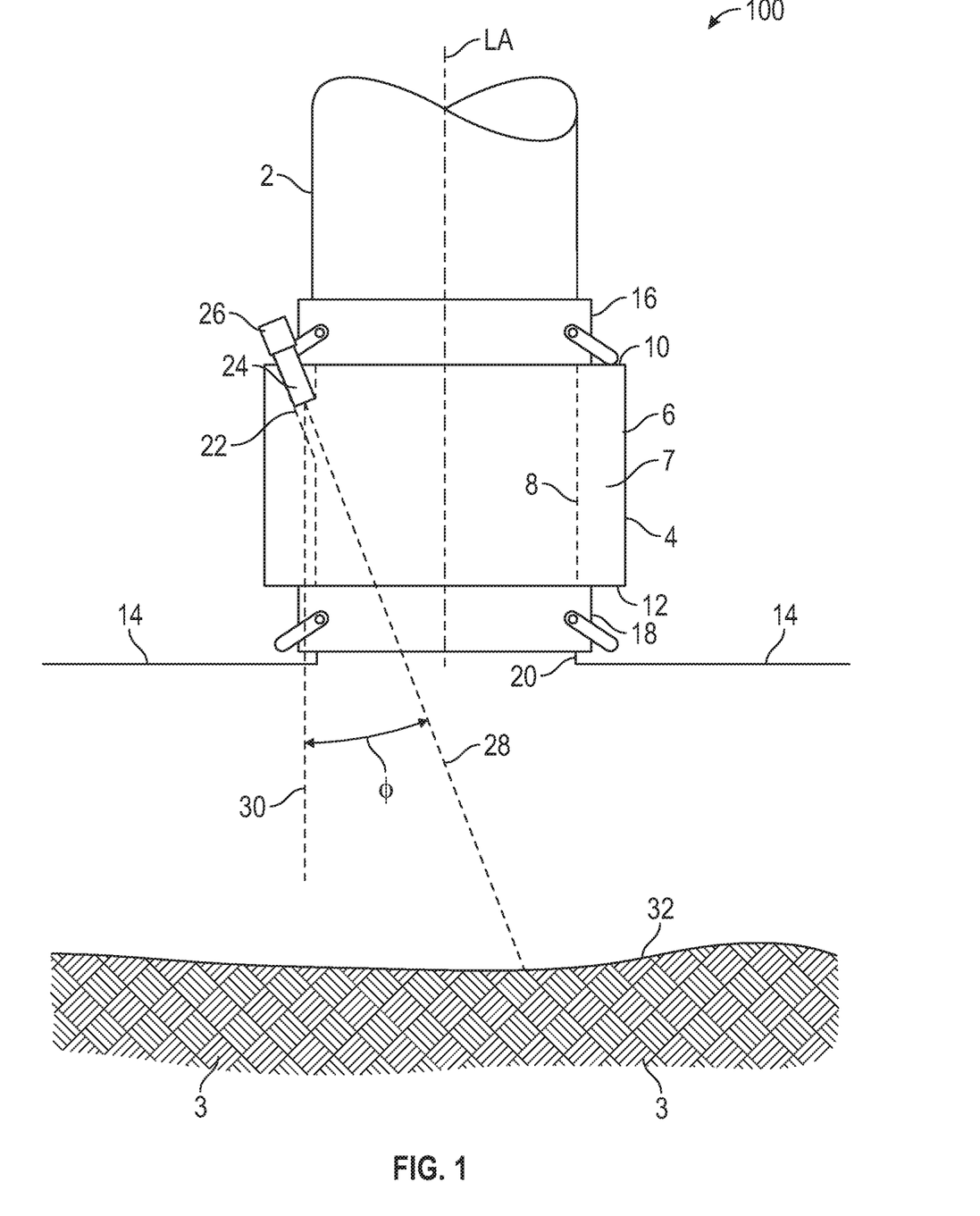
FIGS. 1, 2, and 3, are schematic side elevation views of three embodiments of the present disclosure.

Certain embodiments, such as embodiment 100 illustrated schematically in FIG. 1, may employ a "collar type" device 4 attached to an end of a cuttings fill hose or chute 2 that is then connected to a skip fill opening 20, typically but not necessarily located on a top 14 of the enclosed skip. In certain other embodiments, collar 4 could be installed on the skip fill opening 20 first, then the discharge hose/chute 2 attached to collar 4. Connection of collar 4 to the hose/chute 2 and skip fill opening 20 may be with industry standard type connections 16, 18 such as cam and groove fittings known under the trade designation "CAMLOCK" fittings, threaded fittings, compression or friction fittings, flange fittings, and the like.

Collar 4 comprises a body having a first end 10, a second end 12, and a sidewall 7 connecting first and second ends 10, 12, and a longitudinal axis "LA". Suitable adapters (not illustrated) may be installed on first and second collar ends 10, 12 to allow collar 4 to be connected to any specific connection either on hose/chute 2 or skip opening 20 or both. Collar 4 further includes an external surface 6, an internal surface 8, where internal surface 8 defines a longitudinal through passage or bore for contaminated cuttings to pass through collar 4 and into the skip, onto a pile of cuttings 3. Sidewall 7 is parallel to the longitudinal axis LA.

In certain embodiments, a TOF sensor or instrument 24 may be removably attached to collar 4 via a sensor receiver 22 in collar sidewall 7 as illustrated schematically in FIG. 1 extending from the external surface 6 to the internal surface 8 of body sidewall 7. The sensor may be removably attached for example by rubber seals on the outside of TOF sensor 24 or inside of receiver 22, welding, brazing, threaded couplings, QC/QDC couplings, API couplings, clamps, or other fasteners. It will be appreciated that TOF sensor 24 need not be "permanently" installed in sensor receiver 22. In certain embodiments TOF instrument 24 may have a display 26 included with it. TOF instrument 24 in embodiment 100 would most probably be a single point measurement device. In certain exemplary embodiments, TOF instrument 24 may be positioned to be non-obstructive to the cuttings falling through hose/chute 2 into the skip, allowing a single beam 28 of energy (for example, laser energy) to target a top 32 of cuttings pile 3. Beam 28 is at an angle Ø to plumb line 30, the latter being parallel to a longitudinal axis "LA" of collar 4. In certain other embodiments, the sensor could be "stabbed" into a "sensor receiver" positioned in the collar, or even in the skip roof 14 or a skip sidewall (not illustrated), or sensor receiver 22 may be installed on another access cover of the skip. The sensor receiver (and thus the sensor) has an axis skewed at an angle Ø from the sidewall of the body, wherein Ø ranges from greater than 0° to less than about 90°, or from about 5° to about 60°, or from about 10° to about 45°. All sub-ranges, point values and endpoints within these ranges for angle Ø are explicitly disclosed herein.

In certain embodiments, not illustrated, a sensor may be positioned outside or adjacent collar 4 or even adjacent to a sidewall or roof 14 of the skip. In certain embodiments, the sensor may be on a stand or frame outside of and adjacent to the skip. In certain embodiments there might be a "stand" or frame separate from and not adjacent to the skip, where the sensor is mounted on a movable wand or hose-like device that could be stabbed into sensor receiver 22 in collar 4, or into a sensor receiver in the roof 14 or a sidewall of the skip. Certain TOF sensors suitable for embodiments where the sensor is outside of the skip may include ionizing radiation sensors (including gamma ray, X-ray, alpha particle, and beta particle sensors).

Figure 2:
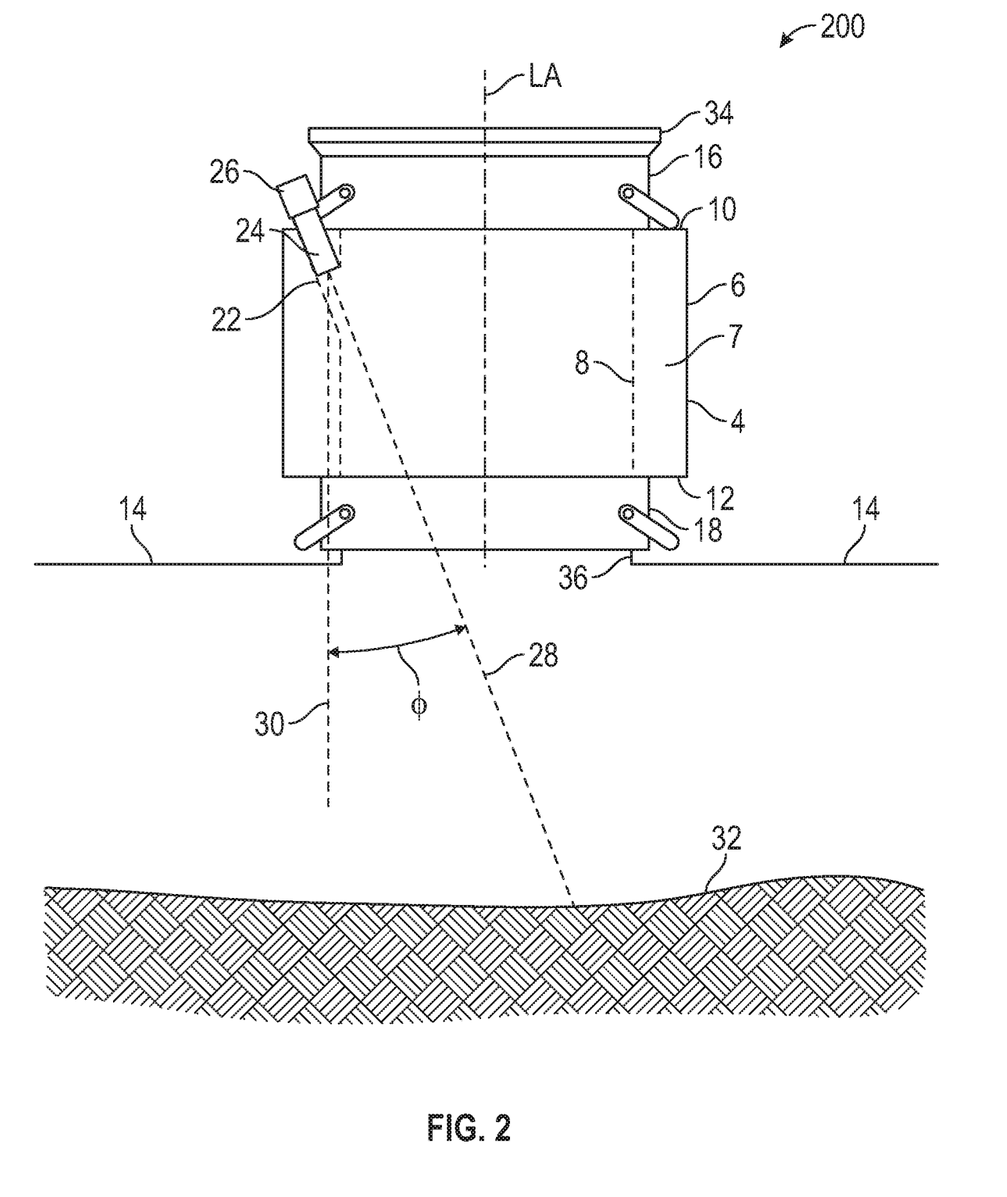

In certain other embodiments, such as embodiment 200 illustrated schematically in FIG. 2, the same collar 4 as in embodiment 100 could be installed on one of the other available, non-fill openings 36 on the skip. In embodiment 200, a blind or blank cap 34 would be installed on first (upper) collar end 10 to provide a gas tight seal on collar 4. Connection of collar 4 to the non-fill opening 36 on the skip would be with industry standard type connections such as a cam and groove fitting known under the trade designation CAMLOCK fitting, or threaded fittings, and the like. If necessary, adapters may installed to the collar second end 12 to allow the apparatus to be connected to any specific connection on the skip non-fill opening. The TOF instrument 24 may be attached to collar 4 as illustrated schematically in FIG. 2. In certain embodiments, TOF instrument 24 may have a display 26 included with it. The TOF instrument 24 in embodiments such as embodiment 200 would most probably be a single point measurement device.

Figure 4:
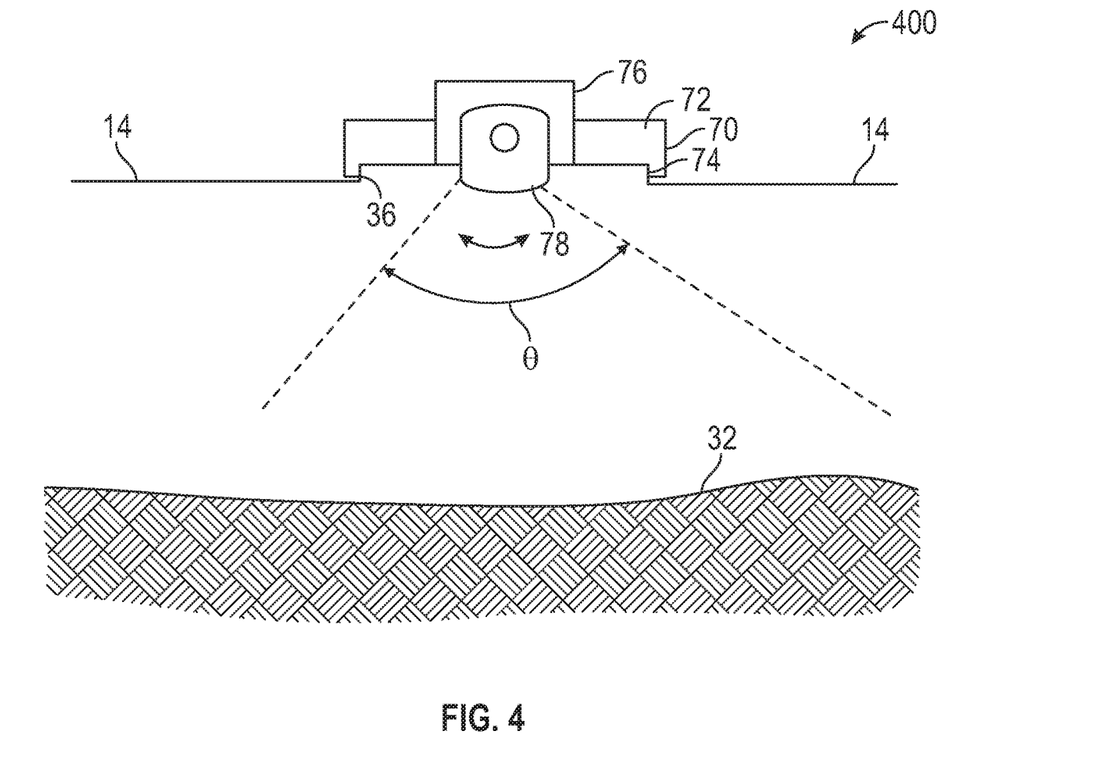
FIGS. 4, 5A, and 5B, are schematic side elevation views of a fourth embodiment of the present disclosure.
Figure 5A:
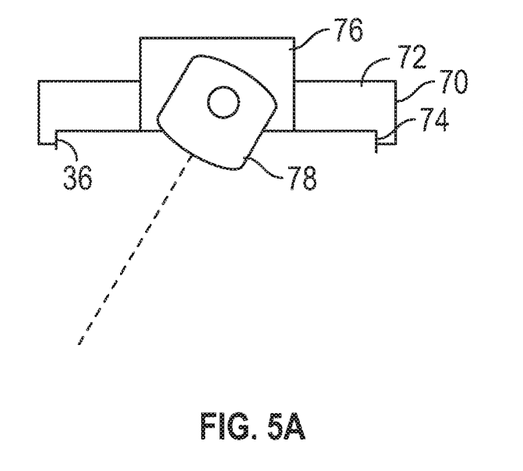
Figure 5B:
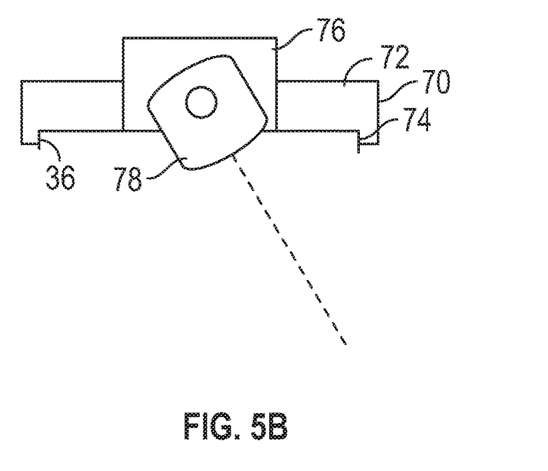

In embodiments such as embodiment 400 illustrated schematically in FIGS. 4, 5A, 5B, and 6 using a multiple point scanning apparatus, installation would be more suited to a dedicated opening on the cuttings skip, in other words not one being used by the cuttings fill hose/chute 2. Referring to FIG. 4, the multiple point scanning apparatus 78 may be installed within a housing 76 which is fitted to a coupling 70. The coupling 70 may then made up directly to a non-fill opening 36 on the skip.

Figure 3:
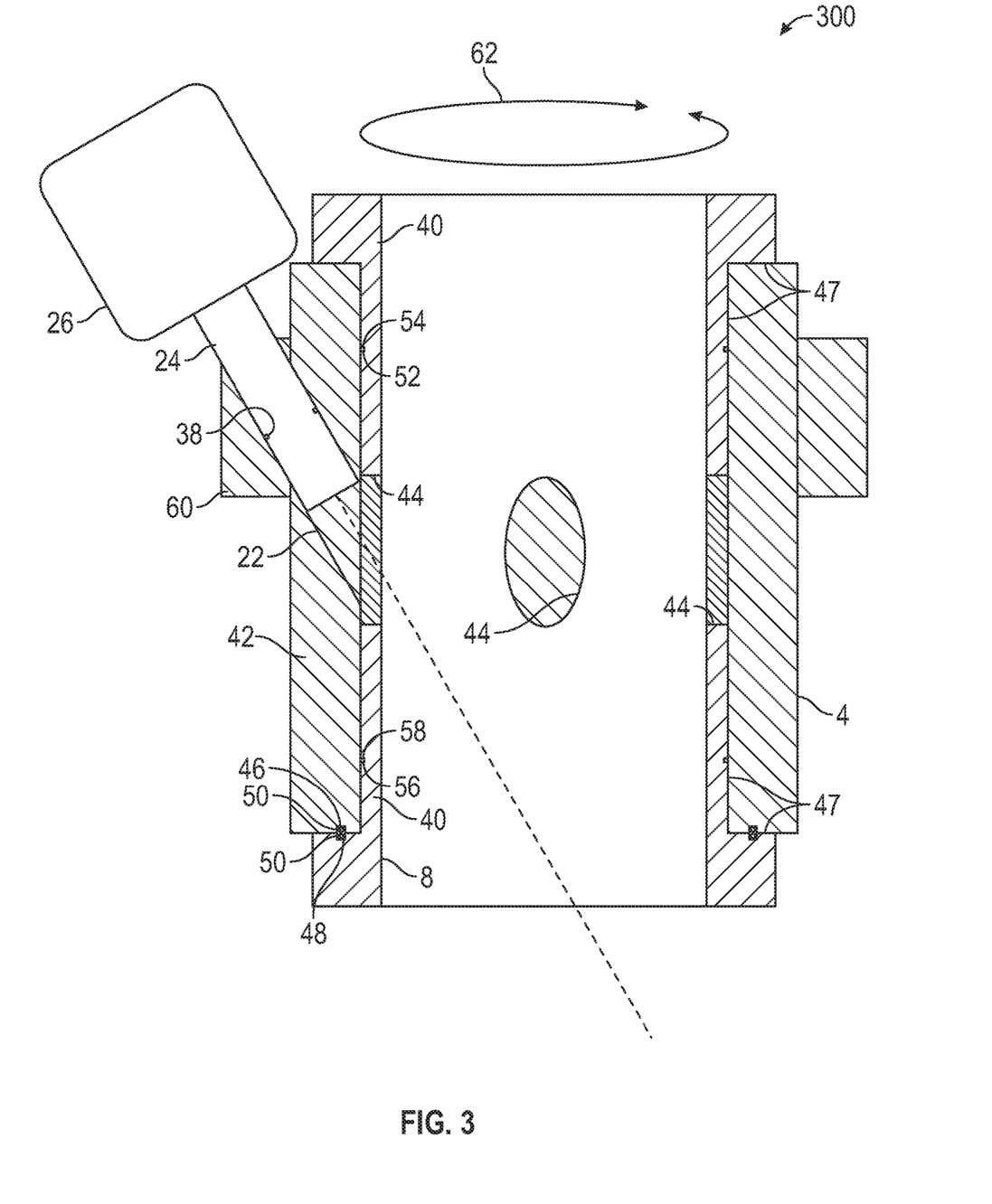

Referring now to FIG. 3, in embodiments where a single point measurement is made, irrespective of the installation position, collar 4 may be designed to enable the TOF instrument 24 to be rotated in the horizontal plane, such as in embodiment 300 illustrated schematically in FIG. 3. In this sense, the phrase "single point measurement" means only that a single time of flight sensor is employed, not that level at only a single point in the skip is measured. In these embodiments, rotation in the horizontal plane will allow the TOF instrument 24 to measure cuttings depths at various points within the enclosed skip. In doing so, the apparatus will give an indication of the volume of cuttings within the skip and how evenly they are being distributed within the skip. As illustrated schematically in FIG. 3, and as further described herein, these embodiments may include bearings and seals within collar 4, allowing the apparatus to rotate while keeping it gas tight.

The TOF sensor or instrument 24 may be threaded, latched, welded or otherwise removably inserted into sensor receiver 22 on collar 4. Rubber or other seals 38 (FIG. 3) within sensor receiver 22 or on the exterior of TOF instrument 24 (or both) may be employed to ensure a gas tight seal between TOF instrument 24 and an interior of sensor receiver 22. TOF instrument 24 may be positioned to be unobtrusive within the full bore diameter of collar 4. In exemplary embodiments collar 4 through passage defined by internal surface 8 will not pose any form of restriction to falling cuttings. However, in certain embodiments (not illustrated) one or more baffles or other flow-modifying internal elements may extend from internal surface 8 of collar 4.

The TOF instrument 24 may, in certain embodiments, be powered from within the instrument display 26 or other human/machine interface (HMI) itself, for example using batteries, Li-ion or other type. In other embodiments display/HMI 26 may be powered from an instrument cable providing power to TOF instrument 24, perhaps by a local generator, or grid power. Display/HMI 26 on TOF instrument 24 allows an operator to interface with the instrument. In certain embodiments the operator will be able to take measurements, view or read these measurements and reset the instrument for subsequent measurement taking. If display/HMI 26 is connected to a power cable, then measurements may be taken remotely, stored and reset as necessary.

In certain embodiments the collar 4 (FIGS. 1-3) and coupling 70 (FIGS. 4, 5A, 5B, and 6) may be comprised of a suitable material to withstand an oilfield environment. Such materials function to keep ambient air out of the skip while keeping vapors from the cuttings in the skip. Suitable materials include various metals and alloys, natural and man-made rubber compounds, elastomeric compounds, thermoplastic-elastomeric compounds, and the like, with or without fillers, additives, coupling agents, and other optional additives. Collar 4 and coupling 70 should have sufficient strength to withstand any mechanical stress (compression, tensile, shear) or other loads imposed by the items connected to it. Collar 4 and coupling 70 should be capable of withstanding long term exposure to probable liquids and vapors, including hydrocarbons, drilling fluids (oil-based and water-based), solvents, brine, anti-freeze compositions, hydrate inhibition chemicals, and the like, typically encountered in offshore and onshore drilling activities.

Referring again to embodiment 300 illustrated schematically in FIG. 3, collar 4 is comprised of a stationary inner sidewall portion 40 having two or more ports 44 and a formed or milled bay 47, and a rotatable outer sidewall portion 42 positioned in bay 47. Rotation of rotatable outer sidewall portion 42 (as indicated by curved double-headed arrow 62) may be facilitated through a bearing type configuration comprising machined or formed grooves 46, 48 and bearings 50, collectively referred to as a bearing. Bearing 46, 48, 50 will be able to withstand the same environment as the collar within which it is housed. Bearing 46, 48, 50 is preferably a low maintenance-type bearing suited to the same zone rating required of the apparatus—in certain exemplary embodiments it will not cause any spark. In embodiment 300 and similar embodiments, bearing 46, 48, 50 is configured such that an operator will be able to rotate rotatable outer sidewall portion 42 of collar 4 manually without the aid of additional tools, although in certain other embodiments the use of specific tools may be required. Special tools may be desired in view of security or threat of malfeasance. In certain embodiments, rotatable outer sidewall 42 of collar 4 may be equipped with one or more handles installed thereon (not illustrated) to allow for ease of rotation thereof. Additional grooves 52, 56 machined or formed in stationary inner sidewall portion 40 may respectively allow seals 54, 58 to be held therein, providing containment of any vapors that may seek to escape via ports 44 between inner and outer sidewalls 40, 42 of collar 4. A support ring 60 composed of the same or different material as rotatable outer sidewall portion may be present as illustrated schematically in FIG. 3 for supporting the TOF sensor unit.

Apparatus of the present disclosure will work by the operator (either at the apparatus or remotely) initiating the TOF instrument 24 to take a reading. The TOF instrument, using the principle of "time of flight" will record a time and knowing the speed of the beam, determine the distance from the TOF sensor within the instrument to the target point 32 on top of the cuttings pile 3. The apparatus will then convert this time into a distance and correct for the deviation (angle Ø) to give a height of the cuttings bed within the skip. Further calculations performed within the apparatus may allow the operator to read the volume of cuttings within the skip and the rate at which cuttings are entering the skip. If the density of a representative sample of the cuttings has been entered into the apparatus, the apparatus may also determine an estimated weight of cuttings within the skip.

The rotatable outer sidewall portion 42 may then be rotated about its vertical axis (collar longitudinal axis "LA") to allow the TOF instrument 24 to take another measurement of the top of the cuttings bed. By performing additional readings through different planes, the operator will be able to determine how well the cuttings are leveling out within the enclosed cutting skip. The apparatus may include algorithms that allow the operator insight as to how well the cuttings have leveled out within the enclosed cuttings skip.

Referring now to FIGS. 4, 5A 5B, and 6, embodiment 400 of a movable multipoint TOF scanner 78 illustrated schematically therein comprises an array of a plurality of TOF sensors, the scanner installed within a housing 76 which in turn is retained within a coupling 70 having a coupling body 72. Coupling body 72 connects directly via a formed mate and seal surface 74 to a desired non-cuttings-fill opening 36 on top surface 14 of the skip. Mate and seal surface 74 and non-cuttings —fill opening 36 may be threaded, friction fitting, cam and groove fittings, or other fittings acceptable in the oil & gas industry and local regulations. The movable multipoint TOF scanner 78 may be aligned to provide the optimum scanning path down into the skip. More specifically, scanner housing 76 is configured to allow the movable multipoint TOF scanner to sweep scan using the array of TOF sensors producing a plurality of TOF beams through a head space of the enclosed cuttings skip. The movable multipoint TOF scanner is able to sweep through an angle θ ranging from 0 to about 180°, or from about 20° to about 160°, or from about 40° to about 120°, the angle θ measured in a plane perpendicular to horizontal. All sub-ranges, point values and endpoints within these ranges for angle θ are explicitly disclosed herein.

Figure 6:
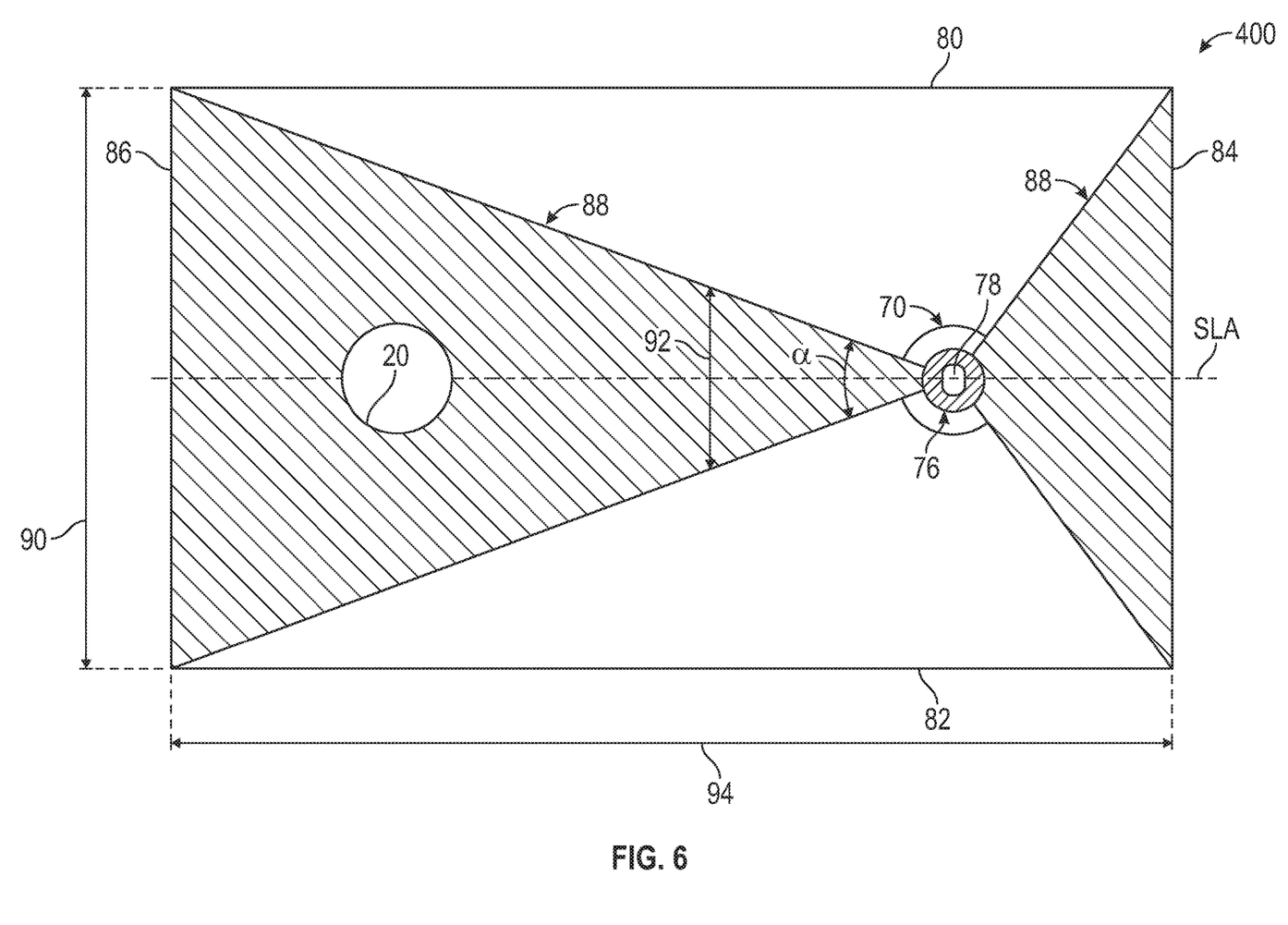
FIG. 6 is a schematic plan view of the embodiment schematically illustrated in FIGS. 4, 5A, and 5B.

The array of TOF sensors of the movable multipoint TOF scanner is configured to have a lateral scan angle α at least large enough to scan as wide as an internal width of the enclosed cuttings skip, as illustrated in the plan view of FIG. 6. Lateral scan angle α may range from 20 to about 180°, or from about 40° to about 160°, or from about 60° to about 120°. All sub-ranges, point values and endpoints within these ranges for angle α are explicitly disclosed herein. The angle α is measured in a plane defined by three points: in embodiment 400 the point may be a center of the scanner, a point on a first long sidewall 80 of the skip, and a point on a second long sidewall 82 of the skip. Cuttings skips are typically rectangular in plan and include two long sidewalls 80, 82, and two shorter end walls 84, 86. As the movable multipoint TOF scanner 78 rotates about a horizontal axis of the scanner, angle α and beam width 92 both increase as the multipoint beam 88 begins scanning at end wall 84 and moves toward a position directly beneath coupling 70, then angle α and beam width 92 decreases as the multipoint beam 88 moves along the width 90 and length 94 of the skip towards end wall 86. Various other scanning schemes could be used, for example, from one sidewall 80 to the other sidewall 82. The coupling 70, housing 76, and movable multipoint TOF scanner are illustrated as positioned along the skip longitudinal axis "SLA", but this is not necessary in all embodiments.

The housing 76 is powered, and has the ability to rotate the movable multipoint TOF scanner 78 through the required angle such that the scanner completely scans the internal surface of the skip (FIG. 6) onto which it is attached. Completing a full sweep, algorithms within the scanner or externally housed software calculate the volume of cuttings within the skip.

In certain embodiments, a movable multipoint TOF scanner 78 may be installed that does not require an external mechanism within the housing to make it sweep through the require angle. The discussed scanner would have an internal ability to sweep through the required path. Such "push button" scanners are available from Leica Geosystems, under the trade designation BLK360. As explained on the Leica Geosystems website, to operate this scanner, an operator would press a button on the scanner once to turn it on. When an LED ring is steady green, the operator would press the button again to start a scan. First, the scanner completes a rotation to measure the ambient light. Then, it makes a second rotation with stops. At each stop, it captures a slice of a spherical image. Each slice is automatically stitched together to create a full-dome image. Next, the scanner known under the trade designation BLK360 executes a third rotation, scanning 360,000 laser points/sec, each with a unique 3D position. Combined, the laser points replicate the objects that surround it in the form of a point cloud. The resulting point cloud is a 3D representation of real world conditions that make accurate dimensions available in 3D design software. The cameras and scanner are precisely aligned so 3D measurements can be taken directly on the spherical imagery and combined to produce a visually rich, and highly accurate representation of reality. The generated image will lead to calculation of the volume of contaminated cuttings in the skip.

The housing 76 and coupling mate and seal surface 74 would both provide a gas tight connection to the opening onto which they are installed. The movable multipoint TOF scanner 78, housing 76 and coupling 70 are all made of material capable of withstanding prolonged exposure to the chemical/vapor environment typical to such an enclosed cuttings skip, as discussed herein. In certain embodiments power would be supplied to scanner 78 at a voltage and current that enables the device to be intrinsically safe. By "intrinsically safe" is meant the definition of intrinsic safety used in the relevant IEC apparatus standard IEC 60079-11, defined as a type of protection based on the restriction of electrical energy within apparatus and of interconnecting wiring exposed to the potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

Operation of the movable multipoint TOF scanner 78 could be set at various intervals. In certain embodiments the movable multipoint TOF scanner 78 may continuously scan or, in certain other embodiments be set to periodic scanning. Measurements taken of the surface 32 of the cuttings pile 3 allow the software to calculate the volume of cuttings within the skip. This measurement on a time-based axis allows calculation of the rate at which cuttings are being deposited into the skip. In certain embodiments options may exist to view a computer-generated topography of the cuttings surface and thus determine if the cuttings are piling up directly beneath the hose/chute 2.

Certain embodiments may employ a 3D time of flight sensor. Such sensors may be exemplified by those described by Texas Instruments. 3D time of flight products, tools and development kits enable machine vision with a real-time 3D imaging depth camera. From robotic navigation to gesture recognition and building automation, TI's 3D time of flight chipsets allow for maximum flexibility to customize a camera's design. 3D time of flight operates by illuminating an area with modulated IR light. By measuring the phase change of the reflected signal the distance can be accurately determined for every pixel in the sensor creating a 3D depth map of the subject or scene.

One suitable TOF sensor is the sensor known under the trade designation "OPT8241 time-of-flight (TOF) sensor" available from Texas Instruments (TI). The device combines TOF sensing with an optimally-designed analog-to-digital converter (ADC) and a programmable timing generator (TG). The device offers quarter video graphics array (QVGA 320×240) resolution data at frame rates up to 150 frames per second (600 readouts per second). The built-in TG controls the reset, modulation, readout, and digitization sequence. The programmability of the TG offers flexibility to optimize for various depth-sensing performance metrics (such as power, motion robustness, signal-to-noise ratio, and ambient cancellation). Features of the TOF sensor known under the trade designation "OPT8241 time-of-flight (TOF) sensor" available from Texas Instruments (TI) are provided in Table 1.

TABLE 1

| "OPT8241 time-of-flight (TOF) sensor" available from Texas Instruments (TI) |
|---|
| Imaging Array: |
|    320 × 240 Array |
|    1/3" Optical Format |
|    Pixel Pitch: 15 μm |
|    Up to 150 Frames per Second |
| Optical Properties: |
|    Responsivity: 0.35 A/W at 850 nm |
|    Demodulation Contrast: 45% at 50 MHz |
|    Demodulation Frequency: 10 MHz to 100 MHz |
| Output Data Format: |
|    12-Bit Phase Correlation Data |
|    4-Bit Common-Mode (Ambient) |
| Chipset Interface: |
|    Compatible with TI's Time-of-Flight Controller OPT9221 |
| Sensor Output Interface: |
|    CMOS Data Interface (50-MHz DDR, 16-Lane Data, Clock and Frame Markers) |
|    LVDS: |
|       600 Mbps, 3 Data Pairs |
|       1-LVDS Bit Clock Pair, 1-LVDS Sample Clock Pair |
| Timing Generator (TG): |
|    Addressing Engine with Programmable Region of Interest (ROI) |
|    Modulation Control |
|    De-Aliasing |
|    Master, Slave Sync Operation |
| I²C Slave Interface for Control |
| Power Supply: |
|    3.3-V I/O, Analog |
|    1.8-V Analog, Digital, I/O |
|    1.5-V Demodulation (Typical) |
| Optimized Optical Package (COG-78): |
|    8.757 mm × 7.859 mm × 0.7 mm |

TABLE 1-continued

"OPT8241 time-of-flight (TOF) sensor"
available from Texas Instruments (TI)

Integrated Optical Band-Pass Filter
(830 nm to 867 nm)
Optical Fiducials for Easy Alignment
Operating Temperature: 0° C. to 70° C.

What has not been recognized or realized is an apparatus and method to determine cuttings level in enclosed cuttings skips safely and with fewer crane lifts. Apparatus and methods to accomplish this without significant risk to rig workers is highly desirable. As explained previously, rather non-technical and unsafe methods exist to determine cuttings level in enclosed skips, but rig personnel do not necessarily favor these methods. The present inventor, however, personally knows of the inefficiencies of such practices and the inherently unsafe conditions they create. Multiple accidents have injured rig workers, and/or exposed rig workers unnecessarily to noxious fumes on working drill rigs. As an additional safety feature, in practice, for example for offshore use, the sensor and scanner mounting apparatus of the present disclosure may be painted or otherwise colored or made reflective for ease of recognition.

Figure 8:
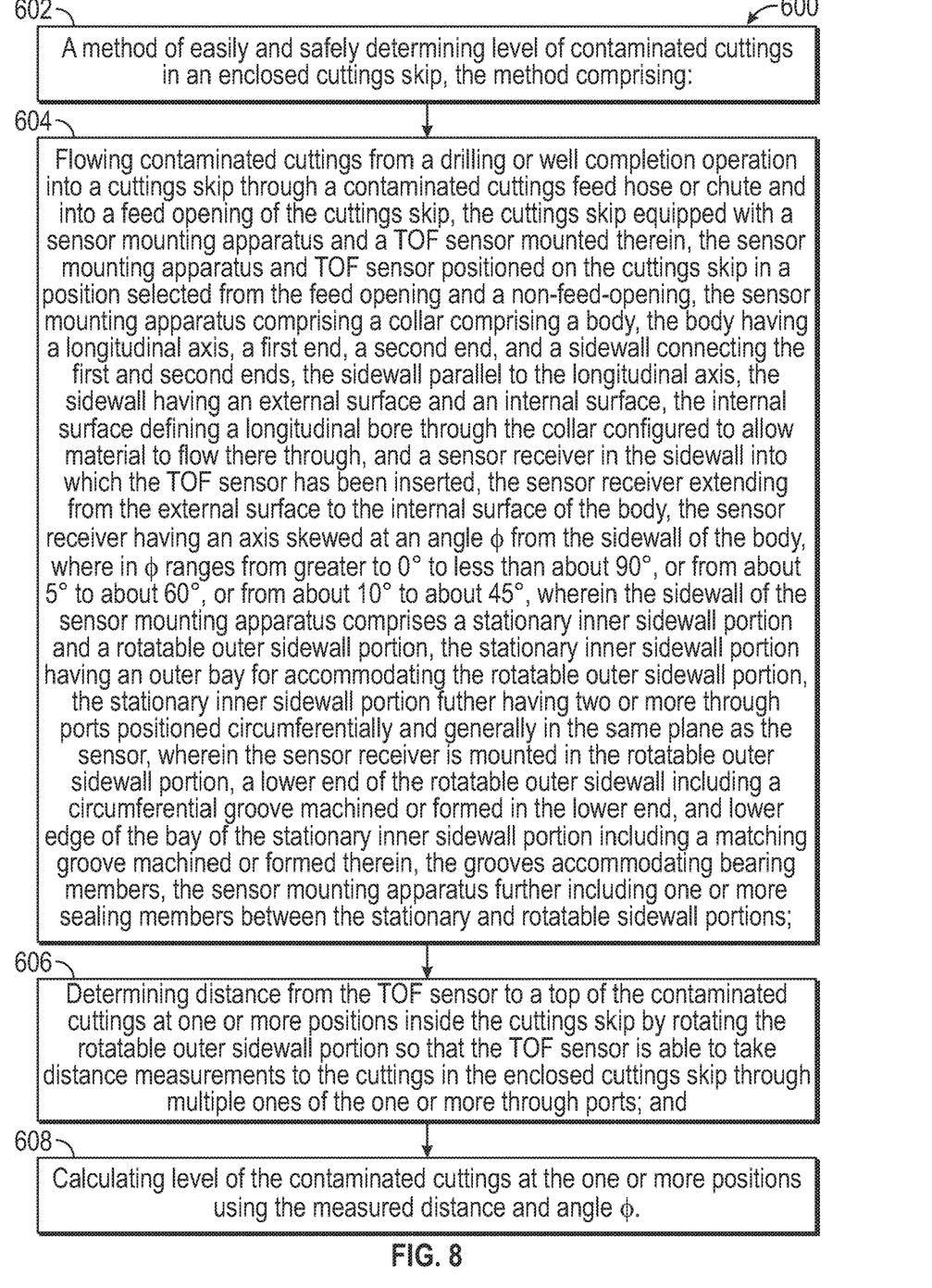
Figure 9:
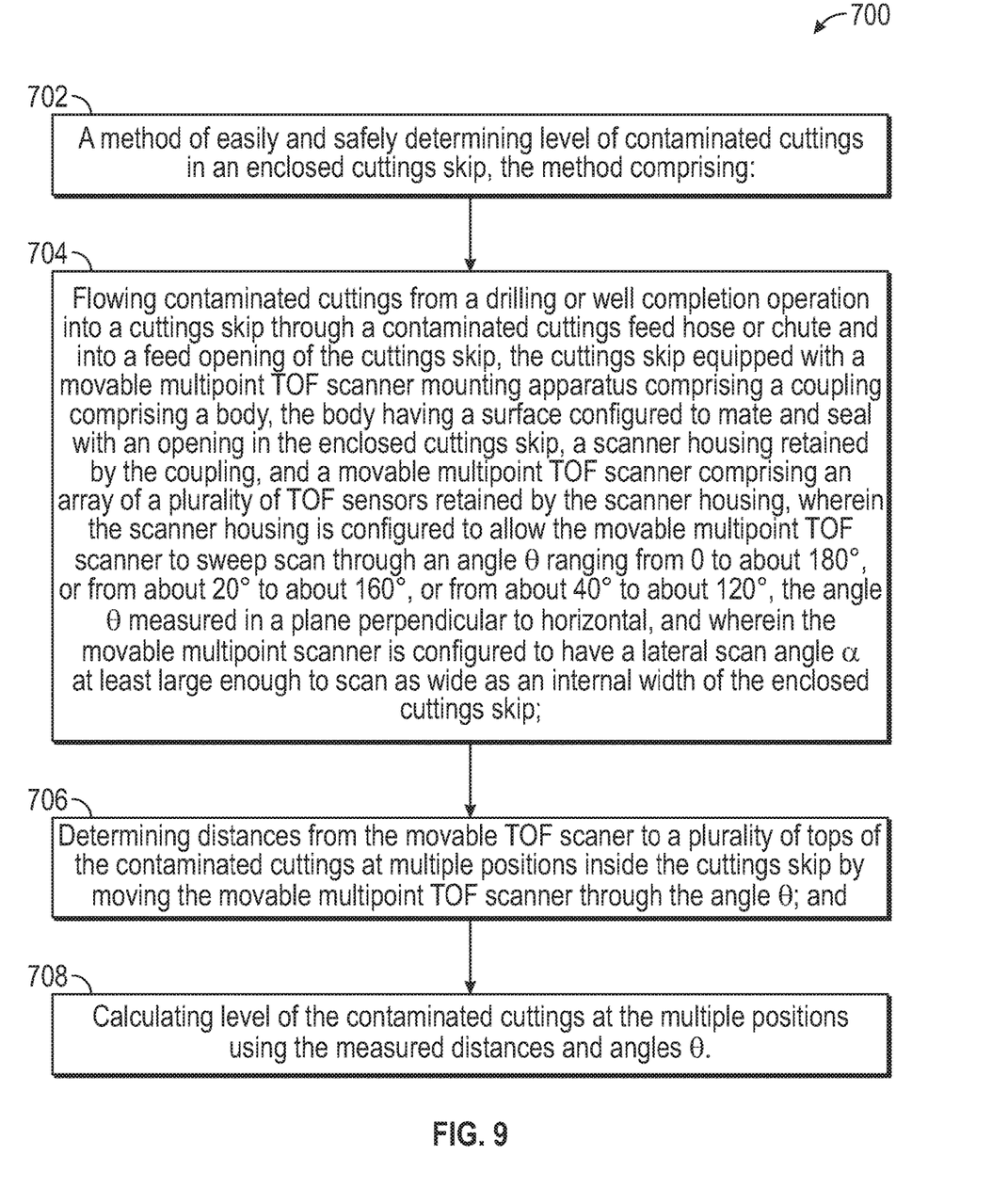

FIGS. 7, 8, and 9 are logic diagrams of three method embodiments 500, 600, and 700 for easily and safely determining level of contaminated cuttings in an enclosed cuttings skip. Method embodiment 500, illustrated in the logic diagram of FIG. 7, comprises a method of easily and safely determining level of contaminated cuttings in an enclosed cuttings skip, the method comprising (box 502) flowing contaminated cuttings from a drilling or well completion operation into a cuttings skip through a contaminated cuttings feed hose or chute and into a feed opening of the cuttings skip, the cuttings skip equipped with a sensor mounting apparatus and a TOF sensor mounted therein, the sensor mounting apparatus and TOF sensor positioned on the cuttings skip in a position selected from the feed opening and a non-feed-opening, the sensor mounting apparatus comprising a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through, and a sensor receiver in the sidewall into which the TOF sensor has been inserted, the sensor receiver extending from the external surface to the internal surface of the body, the sensor receiver having an axis skewed at an angle Ø from the sidewall of the body, wherein Ø ranges from greater than 0° to less than about 90°, or from about 5° to about 60°, or from about 10° to about 45° (box 504). Method embodiment 500 further comprises determining distance from the TOF sensor to a top of the contaminated cuttings at one or more positions inside the cuttings skip by operating the TOF sensor (box 506), and calculating level of the contaminated cuttings at the one or more positions using the measured distance and angle Ø ((box 508).

Method embodiment 600, illustrated in the logic diagram of FIG. 8, is a method of easily and safely determining level of contaminated cuttings in an enclosed cuttings skip, the method comprising (box 602) flowing contaminated cuttings from a drilling or well completion operation into a cuttings skip through a contaminated cuttings feed hose or chute and into a feed opening of the cuttings skip, the cuttings skip equipped with a sensor mounting apparatus and a TOF sensor mounted therein, the sensor mounting apparatus and TOF sensor positioned on the cuttings skip in a position selected from the feed opening and a non-feed-opening, the sensor mounting apparatus comprising a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through, and a sensor receiver in the sidewall into which the TOF sensor has been inserted, the sensor receiver extending from the external surface to the internal surface of the body, the sensor receiver having an axis skewed at an angle Ø from the sidewall of the body, wherein Ø ranges from greater than 0° to less than about 90°, or from about 5° to about 60°, or from about 10° to about 45°, wherein the sidewall of the sensor mounting apparatus comprises a stationary inner sidewall portion and a rotatable outer sidewall portion, the stationary inner sidewall portion having an outer bay for accommodating the rotatable outer sidewall portion, the stationary inner sidewall portion further having two or more through ports positioned circumferentially and generally in the same plane as the sensor, wherein the sensor receiver is mounted in the rotatable outer sidewall portion, a lower end of the rotatable outer sidewall including a circumferential groove machined or formed in the lower end, and a lower edge of the bay of the stationary inner sidewall portion including a matching groove machined or formed therein, the grooves accommodating bearing members, the sensor mounting apparatus further including one or more sealing members between the stationary and rotatable sidewall portions (box 604). Method embodiment 600 further comprises determining distance from the TOF sensor to a top of the contaminated cuttings at one or more positions inside the cuttings skip by rotating the rotatable outer sidewall portion so that the TOF sensor is able to take distance measurements to the cuttings in the enclosed cuttings skip through multiple ones of the one or more through ports (box 606), and then calculating level of the contaminated cuttings at the one or more positions using the measured distances and angles Ø (box 608).

Method embodiment 700, illustrated in the logic diagram of FIG. 9, is a method of easily and safely determining level of contaminated cuttings in an enclosed cuttings skip, the method comprising (box 702) flowing contaminated cuttings from a drilling or well completion operation into a cuttings skip through a contaminated cuttings feed hose or chute and into a feed opening of the cuttings skip, the cuttings skip equipped with a movable multipoint TOF scanner mounting apparatus comprising a coupling comprising a body, the body having a surface configured to mate and seal with an opening in the enclosed cuttings skip, a scanner housing retained by the coupling, and a movable multipoint TOF scanner comprising an array of a plurality of TOF sensors retained by the scanner housing, wherein the scanner housing is configured to allow the movable multipoint TOF scanner to sweep scan through an angle Ø ranging from 0 to about 180°, or from about 20° to about 160°, or from about 40° to about 120°, the angle Ø measured in a plane perpendicular to horizontal, and wherein the movable multipoint scanner is configured to have a lateral scan angle α at least large enough to scan as wide as an internal width of the enclosed cuttings skip (box 704). Method embodiment 700 further comprises determining distances from the movable multipoint TOF scanner to a plurality of tops of the contaminated cuttings at multiple positions inside the cuttings skip by moving the movable multipoint TOF scanner through the angle Ø (box 706), and calculating level of the contaminated cuttings at the multiple positions using the measured distances and angles Ø (box 708).

In other embodiments, the collar and coupling need not be round or tubular/cylindrical as illustrated in the drawings, but rather could take any shape, such as a box or cube shape, elliptical, triangular, pyramidal (for example, three or four sided), prism-shaped, hemispherical or semi-hemispherical-shaped (dome-shaped), or combination thereof and the like, as long as the collar or coupling has suitable fittings to connect to the fill hose/chute and the fill or non-fill opening of the skip or other container. In yet other embodiments, the skip rectangular, but this arrangement is not strictly necessary in all embodiments. For example, one or more corners of the skip could be rounded. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, patterns of threaded round-head screws or bolts screwed into holes in the collar), such as oil rig designs, oil tool designs, logos, letters, words, nicknames (for example BIG JAKE, and the like). Hand holds may be machined or formed to have easy-to-grasp features for fingers, or may have rubber grips shaped and adorned with ornamental features, such as raised knobby gripper patterns.

Thus the apparatus, systems, and methods described herein provide a quick and safe way of determining contaminated cuttings level in an enclosed cuttings skip without having to open the enclosed cuttings skips, and with significantly reduced risk of injury and breathing discomfort to rig workers.

Embodiments disclosed herein include:

A: A Sensor Mounting Apparatus Comprising:
(a) a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through;
(b) a sensor receiver in the sidewall configured to receive therein a sensor, the sensor receiver extending from the external surface to the internal surface of the body, the sensor receiver having an axis skewed at an angle Ø from the sidewall of the body, wherein Ø ranges from greater than 0° to less than about 90°, or from about 5° to about 60°, or from about 10° to about 45°.

B. A scanner mounting apparatus comprising:
(a) a coupling comprising a body, the body having a surface configured to mate and seal with an enclosed cuttings skip opening;
(b) a scanner housing retained by the coupling; and
(c) a movable multipoint TOF scanner comprising an array of a plurality of TOF sensors retained by the scanner housing, wherein the scanner housing is configured to allow the movable multipoint TOF scanner to sweep scan using the array of TOF sensors producing a plurality of beams through a head space of the enclosed cuttings skip, the movable multipoint TOF scanner able to sweep through an angle Ø ranging from 0 to about 180°, or from about 20° to about 160°, or from about 40° to about 120°, the angle Ø measured in a plane perpendicular to horizontal, and wherein the array of TOF sensors of the movable multipoint TOF scanner is configured to have a lateral scan angle α at least large enough to scan as wide as an internal width of the enclosed cuttings skip.

C: A method of easily and safely determining level of contaminated cuttings in an enclosed cuttings skip, the method comprising:
(a) flowing contaminated cuttings from a drilling or well completion operation into a cuttings skip through a contaminated cuttings feed hose or chute and into a feed opening of the cuttings skip, the cuttings skip equipped with a sensor mounting apparatus and a TOF sensor mounted therein, the sensor mounting apparatus and TOF sensor positioned on the cuttings skip in a position selected from the feed opening and a non-feed-opening, the sensor mounting apparatus comprising a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through, and a sensor receiver in the sidewall into which the TOF sensor has been inserted, the sensor receiver extending from the external surface to the internal surface of the body, the sensor receiver having an axis skewed at an angle Ø from the sidewall of the body, wherein Ø ranges from greater than 0° to less than about 90°, or from about 5° to about 60°, or from about 10° to about 45°;
(b) determining distance from the TOF sensor to a top of the contaminated cuttings at one or more positions inside the cuttings skip by operating the TOF sensor; and
(c) calculating level of the contaminated cuttings at the one or more positions using the measured distance and angle Ø.

D: A method of easily and safely determining level of contaminated cuttings in an enclosed cuttings skip, the method comprising:
(a) flowing contaminated cuttings from a drilling or well completion operation into a cuttings skip through a contaminated cuttings feed hose or chute and into a feed opening of the cuttings skip, the cuttings skip equipped with a movable multipoint TOF scanner mounting apparatus comprising a coupling comprising a body, the body having a surface configured to mate and seal with an opening in the enclosed cuttings skip, a scanner housing retained by the coupling, and a movable multipoint TOF scanner comprising an array of a plurality of TOF sensors retained by the scanner housing, wherein the scanner housing is configured to allow the movable multipoint TOF scanner to sweep scan through an angle θ ranging from 0 to about 180°, or from about 20° to about 160°, or from about 40° to about 120°, the angle θ measured in a plane perpendicular to horizontal, and wherein the movable multipoint scanner is configured to have a lateral scan angle α at least large enough to scan as wide as an internal width of the enclosed cuttings skip;
(b) determining distances from the movable multipoint TOF scanner to a plurality of tops of the contaminated cuttings at multiple positions inside the cuttings skip by moving the movable multipoint TOF scanner through the angle θ; and
(c) calculating level of the contaminated cuttings at the multiple positions using the measured distances and angles θ.

Each of the embodiments A, B, C, and D may have one or more of the following additional elements in any combination:

Element 1: the sensor mounting apparatus of embodiment A may further comprise fasteners on the first and second ends allowing the first end to be fastened to a fill hose or chute and the second end to a fill opening for a container.

Element 2: the sensor mounting apparatus of embodiment A may further comprise wherein the fasteners are selected from the group consisting of flanges, QC/QDC couplings, cam and groove (CAMLOCK) fittings, and threaded fittings.

Element 3: the sensor mounting apparatus of embodiment A may further include a TOF sensor removably inserted into the sensor receiver.

Element 4: the sensor mounting apparatus of embodiment A may further comprise wherein the TOF sensor is removably inserted into the sensor receiver by a fastening method selected from the group consisting of welding, brazing, friction fitting, rubber seal fittings, threaded fitting, QC/QDC fittings, and cam and groove fittings.

Element 5: the sensor mounting apparatus of embodiment A may further comprise wherein the sidewall comprises a stationary inner sidewall portion and a rotatable outer sidewall portion, the stationary inner sidewall portion having an outer bay for accommodating the rotatable outer sidewall portion, the stationary inner sidewall portion further having two or more through ports positioned circumferentially and generally in the same plane as the sensor, wherein the sensor receiver is mounted in the rotatable outer sidewall portion, a lower end of the rotatable outer sidewall including a circumferential groove machined or formed in the lower end, and a lower edge of the bay of the stationary inner sidewall portion including a matching groove machined or formed therein, the grooves accommodating bearing members, the sensor mounting apparatus further including one or more sealing members between the stationary and rotatable sidewall portions.

Element 6: the sensor mounting apparatus of embodiment A may be part of a system for easily and safely determining contaminated cuttings level in an enclosed cuttings skip, the system comprising an enclosed cuttings skip; the sensor mounting apparatus removably attached at its second end to a fill opening of the enclosed cuttings skip; and a contaminated cuttings hose or chute removably attached to the first end of the sensor mounting apparatus.

Element 7: the sensor mounting apparatus of Element 5 may be part of a system for easily and safely determining contaminated cuttings level in an enclosed cuttings skip, the system comprising an enclosed cuttings skip; the sensor mounting apparatus of Element 5 removably attached at its second end to a fill opening of the enclosed cuttings skip, and a contaminated cuttings hose or chute removably attached to the first end of the sensor mounting apparatus of Element 5.

Element 8: the sensor mounting apparatus of embodiment A may be part of a system for easily and safely determining contaminated cuttings level in an enclosed cuttings skip, the system comprising an enclosed cuttings skip; the sensor mounting apparatus of embodiment A removably attached at its second end to a non-fill opening of the enclosed cuttings skip, and a contaminated cuttings hose or chute removably attached to a fill opening of the enclosed cuttings skip.

Element 9: the sensor mounting apparatus of Element 5 may be part of a system for easily and safely determining contaminated cuttings level in an enclosed cuttings skip, the system comprising an enclosed cuttings skip the sensor mounting apparatus of Element 5 removably attached at its second end to a non-fill opening of the enclosed cuttings skip, a contaminated cuttings hose or chute removably attached to a fill opening of the enclosed cuttings skip.

Element 10: The scanner mounting apparatus of embodiment B wherein each of the TOF sensors of the array of TOF sensors is selected from the group consisting of an 3D TOF image scanner and a laser.

Element 11: the scanner mounting apparatus of embodiment B wherein the movable multipoint TOF scanner is operated remotely via wired or wireless communication.

Element 12: the scanner mounting apparatus of embodiment B wherein the movable multipoint TOF scanner is operated locally via on-board batteries, an on-board motor, and a programmable logic controller.

Element 13: the scanner mounting apparatus of embodiment B wherein the movable multipoint TOF scanner is configured to scan in modes selected from the group consisting of continuous scan mode and periodic scan mode.

Element 14: the scanner mounting apparatus of embodiment B comprising a software module including one or more algorithms for calculating parameters selected from the group consisting of volume of cuttings in the enclosed cuttings skip, rate of deposition of cuttings in the enclosed cuttings skip, rate of accumulation of cuttings in the enclosed cuttings skip, remaining fillable volume of the enclosed cuttings skip, topography of cuttings in the enclosed cuttings skip, and combinations thereof.

Element: 15: the sensor mounting apparatus of embodiment B may be part of a system for easily and safely determining contaminated cuttings level in an enclosed cuttings skip, the system comprising an enclosed cuttings skip; the sensor mounting apparatus of embodiment B removably attached to a non-fill opening of the enclosed cuttings skip; a contaminated cuttings hose or chute removably attached to a contaminated cuttings fill opening of the enclosed cuttings skip.

Element 16: the sensor mounting apparatus of embodiment B may be part of a system for easily and safely determining one or more contaminated cuttings parameters in an enclosed cuttings skip, the system comprising an enclosed cuttings skip, the sensor mounting apparatus of embodiment B removably attached to a non-fill opening of the enclosed cuttings skip, a contaminated cuttings hose or chute removably attached to a contaminated cuttings filling opening of the enclosed cuttings skip, wherein the sensor mounting apparatus of embodiment B comprises a software module including one or more algorithms for calculating the one or more parameters, the one or more parameters selected from the group consisting of volume of cuttings in the enclosed cuttings skip, rate of deposition of cuttings in the enclosed cuttings skip, rate of accumulation of cuttings in the enclosed cuttings skip, remaining fillable volume of the enclosed cuttings skip, topography of cuttings in the enclosed cuttings skip, and combinations thereof.

Element 17: the method of embodiment C may employ the sensor mounting apparatus of Element 5, and wherein step (b) of the method comprises rotating the rotatable outer sidewall portion so that the TOF sensor is able to take distance measurements to the cuttings in the enclosed cuttings skip through multiple ones of the one or more through ports.

From the foregoing detailed description of specific embodiments, it should be apparent that patentable apparatus, combinations, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to take an existing cuttings skip structure and modify it to include a dedicated threaded opening with a cap thereon for later installation of a sensor or scanner mounting apparatus. Another modification would be for skip suppliers to supply skips with built-in sensor or scanner mounts, with or with out the sensor or scanner attached. In other embodiments, the skips may be trailer-mounted.

What is claimed is:

1. A sensor mounting apparatus comprising:
   (a) a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through;
   (b) a sensor receiver in the sidewall configured to receive therein a sensor, the sensor receiver extending from the external surface to the internal surface of the body, the sensor receiver having an axis skewed at an angle Ø from the sidewall of the body, wherein Ø ranges from greater than 0° to less than about 90°, wherein the sidewall comprises a stationary inner sidewall portion and a rotatable outer sidewall portion, the stationary inner sidewall portion having an outer bay for accommodating the rotatable outer sidewall portion, the stationary inner sidewall portion further having two or more through ports positioned circumferentially and generally in the same plane as the sensor, wherein the sensor receiver is mounted in the rotatable outer sidewall portion, a lower end of the rotatable outer sidewall including a circumferential groove machined or formed in the lower end, and a lower edge of the bay of the stationary inner sidewall portion including a matching groove machined or formed therein, the grooves accommodating bearing members, the sensor mounting apparatus further including one or more sealing members between the stationary and rotatable sidewall portions.

2. The sensor mounting apparatus of claim 1 comprising fasteners on the first and second ends allowing the first end to be fastened to a fill hose or chute and the second end to a fill opening for a container.

3. The sensor mounting apparatus of claim 2 wherein the fasteners are selected from the group consisting of flanges, QC/QDC couplings, cam and groove fittings, and threaded fittings.

4. The sensor mounting apparatus of claim 1 further including a TOF sensor removably inserted into the sensor receiver.

5. The sensor mounting apparatus of claim 4 wherein the TOF sensor is removably inserted into the sensor receiver by a fastening method selected from the group consisting of welding, brazing, friction fitting, rubber seal fittings, threaded fitting, QC/QDC fittings, and cam and groove fittings.

6. A system for easily and safely determining contaminated cuttings level or volume in an enclosed cuttings skip, the system comprising:
   (a) an enclosed cuttings skip;
   (b) the sensor mounting apparatus of claim 1 removably attached at its second end to a fill opening of the enclosed cuttings skip;
   (c) a contaminated cuttings hose or chute removably attached to the first end of the sensor mounting apparatus of claim 1.

7. A system for easily and safely determining contaminated cuttings level or volume in an enclosed cuttings skip, the system comprising:
   (a) an enclosed cuttings skip;
   (b) the sensor mounting apparatus of claim 1 removably attached at its second end to a non-fill opening of the enclosed cuttings skip;
   (c) a contaminated cuttings hose or chute removably attached to a fill opening of the enclosed cuttings skip.

8. A method of easily and safely determining level or volume of contaminated cuttings in an enclosed cuttings skip, the method comprising:
   (a) flowing contaminated cuttings from a drilling or well completion operation into a cuttings skip through a contaminated cuttings feed hose or chute and into a feed opening of the cuttings skip, the cuttings skip equipped with a sensor mounting apparatus and a TOF sensor mounted therein, the sensor mounting apparatus and TOF sensor positioned on the cuttings skip in a position selected from the feed opening and a non-feed-opening, the sensor mounting apparatus comprising a collar comprising a body, the body having a longitudinal axis, a first end, a second end, and a sidewall connecting the first and second ends, the sidewall parallel to the longitudinal axis, the sidewall having an external surface and an internal surface, the internal surface defining a longitudinal bore through the collar configured to allow material to flow there through, and a sensor receiver in the sidewall into which the TOF sensor has been inserted, the sensor receiver extending from the external surface to the internal surface of the body, the sensor receiver having an axis skewed at an angle Ø from the sidewall of the body, wherein Ø ranges from greater than 0° to less than about 90°; wherein the sidewall comprises a stationary inner sidewall portion and a rotatable outer sidewall portion, the stationary inner sidewall portion having an outer bay for accommodating the rotatable outer sidewall portion, the stationary inner sidewall portion further having two or more through ports positioned circumferentially and generally in the same plane as the sensor, wherein the sensor receiver is mounted in the rotatable outer sidewall portion, a lower end of the rotatable outer sidewall including a circumferential groove machined or formed in the lower end, and a lower edge of the bay of the stationary inner sidewall portion including a matching groove machined or formed therein, the grooves accommodating bearing members, the sensor mounting apparatus further including one or more sealing members between the stationary and rotatable sidewall portions,
   (b) determining distance from the TOF sensor to a top of the contaminated cuttings at one or more positions inside the cuttings skip by operating the TOF sensor; and
   (c) calculating level or volume, or both of the contaminated cuttings at the one or more positions using the measured distance and angle Ø.

* * * * *